(12) United States Patent
Moravec et al.

(10) Patent No.: US 6,761,452 B2
(45) Date of Patent: Jul. 13, 2004

(54) LIGHT POLARIZING FILM WITH MELANIN

(75) Inventors: Thomas J. Moravec, Maple Grove, MN (US); Hideyo Sugimura, North Oaks, MN (US)

(73) Assignee: Vision- Ease Lens, Inc., Ramsey, MN (US)

( * ) Notice: Subject to any disclaimer, the term of this patent is extended or adjusted under 35 U.S.C. 154(b) by 0 days.

(21) Appl. No.: 10/207,307

(22) Filed: Jul. 29, 2002

(65) Prior Publication Data

US 2003/0063255 A1 Apr. 3, 2003

Related U.S. Application Data

(60) Provisional application No. 60/308,493, filed on Jul. 27, 2001.

(51) Int. Cl.[7] ............................................... G02C 7/02
(52) U.S. Cl. ........................... 351/177; 351/49; 359/491
(58) Field of Search ............................ 351/177, 159, 351/163–165, 41, 44–45, 47–49; 359/483, 490–492

(56) References Cited

U.S. PATENT DOCUMENTS

| | | | |
|---|---|---|---|
| 4,698,374 A | 10/1987 | Gallas | 523/106 |
| 4,859,039 A | 8/1989 | Okumura et al. | 359/491 |
| 4,992,218 A | 2/1991 | Sugio et al. | 264/1.3 |
| 5,036,115 A | 7/1991 | Gallas | 523/106 |
| 5,047,447 A | 9/1991 | Gallas | 523/106 |
| 5,051,309 A | 9/1991 | Kawaki et al. | 428/332 |
| 5,071,906 A | 12/1991 | Tanaka et al. | 524/557 |
| 5,112,883 A | 5/1992 | Gallas | 523/106 |
| 5,187,207 A | 2/1993 | Gallas | 523/106 |
| 5,326,507 A | 7/1994 | Starzewski | 264/1.3 |
| 5,582,916 A | 12/1996 | Ohtsu et al. | 428/412 |
| 5,751,481 A * | 5/1998 | Dalzell et al. | 359/485 |
| 5,926,310 A * | 7/1999 | Tamura et al. | 359/350 |
| 6,102,539 A | 8/2000 | Tucker | 351/44 |
| 6,113,811 A | 9/2000 | Kausch et al. | 252/585 |
| 6,328,446 B1 * | 12/2001 | Bhalakia et al. | 351/163 |
| 2002/0119302 A1 * | 8/2002 | Fritz | 428/325 |

* cited by examiner

Primary Examiner—Jordan M. Schwartz
(74) Attorney, Agent, or Firm—Mark A. Litman & Assoc. P.A.

(57) ABSTRACT

A dichroic dye can be blended with a non-dichroic dye (melanin and melanin derivatives) and still maintain a commercially acceptable level of polarizing efficiency. Efficient polarizers exhibit polarizing efficiencies of greater or equal to 95% and the best are even greater than or equal to 98%. Since melanin has unique features with respect to absorption of wavelengths of light, melanin is very useful to have in combination with a polarizer that takes advantage of this absorption. The blending can be done by a mixture (preferably an aqueous mixture) of melanin and a dichroic dye in a ratio sufficient to achieve the desired color and polarizing effect.

19 Claims, 4 Drawing Sheets

LIGHT POLARIZING FILM WITH MELANIN

This application claims the benefit of prov. application 60/308,493 filed on Jul. 27, 2001.

BACKGROUND OF THE INVENTION

1. Field of the Invention

The present invention relates to polarizing elements, particularly to polarizing lenses, more particularly to polarizing goggles, eye shields or ophthalmic lenses, and to novel compositions of polarizing layers in ophthalmic lenses comprising melanin and substituted/derivatized melanin.

2. Background of the Art

Optical polarizing film is widely used for glare reduction and for increasing optical contrast in such products as sunglasses and Liquid Crystal Displays (LCD). One of the most commonly used types of polarizers for these applications is a dichroic polarizer which absorbs light of one polarization and transmits light of the orthogonal polarization. One type of dichroic polarizer is made by incorporating a dye into a polymer matrix which is stretched in at least one direction. Dichroic polarizers may also be made by uniaxially stretching a polymer matrix and staining the matrix with a dichroic dye. Alternatively, a polymer matrix may be stained with an oriented dichroic dye. Dichroic dyes include anthraquinone and azo dyes, as well as iodine. Many commercial dichroic polarizers use polyvinyl alcohol as the polymer matrix for the dye.

Another type of polarizer is a reflective polarizer which reflects light of one polarization and transmits light of another orthogonal polarization. One type of reflective polarizer is made by forming a stack of alternating sets of polymer layers, one of the sets being birefringent to form reflective interfaces in the stack. Typically, the indices of refraction of the layers in the two sets are approximately equal in one direction so that light polarized in a plane parallel to that direction is transmitted. The indices of refraction are typically different in a second, orthogonal direction so that light polarized in a plane parallel to the orthogonal direction is reflected.

One measure of performance for polarizers is the extinction ratio. The extinction ratio is the ratio of a) light transmitted by the polarizer in a preferentially transmitted polarization state to b) light transmitted in an orthogonal polarization state. These two orthogonal states are often related to the two linear polarizations of light. However, other types of orthogonal states, such as, left and right-handed circular polarizations or two orthogonal elliptical polarizations may also be used. The extinction ratios of dichroic polarizers vary over a wide range depending on their specific construction and target application. For example, dichroic polarizers may have extinction ratios between 5:1 and 3000:1. Dichroic polarizers used in display systems typically have extinction ratios which are preferably greater than 100:1 and even more preferably greater than 500:1.

Dichroic polarizers typically absorb light in the non-transmission polarization. However, dichroic polarizers also absorb some of the light having the high transmission polarization. The amount of this absorption depends on the details of the construction of the polarizer and the designed extinction ratio. For high performance display polarizers, such as those used in LCDs, this absorption loss is typically between about 5 and 15%. The reflectivity of these polarizers for light having the absorption (i.e., low transmission) polarization tends to be small. Even with surface reflections included, this reflectivity is typically less than 10% and usually less than 5%.

Reflective polarizers typically reflect light having one polarization and transmit light having an orthogonal polarization. Reflective polarizers often have incomplete reflectivity of the high extinction polarization over a wavelength region of interest. Typically, the reflectivity is greater than 50% and is often greater than 90% or 95%. A reflective polarizer will also typically have some absorption of light having the high transmission polarization. Typically, this absorption is less than about 5 to 15%. Structures and materials for the manufacture of light polarizing films with polyvinyl alcohol (PVA) and dichroic dyes include at least U.S. Pat. Nos. 4,859,039, 4,992,218, 5,051,309, 5,071,906, 5,326,507, 5,582,916, and 6,113,811. These patents are incorporated herein in their entirety for their disclosure of materials, ancillary materials, and processes and structures for polarizing elements and layers.

Ophthalmic lenses are also well known for having dyes and/or pigments therein for absorbing electromagnetic radiation, particularly electromagnetic radiation such as visible radiation, ultraviolet radiation and any other ionizing radiation. The use of Melanin as a pigment in ophthalmic lenses for absorbing electromagnetic radiation is taught in U.S. Pat. Nos. 5,112,883, 5,047,447, 5,036,115, and 4,698,374, which patents are incorporated herein by reference in their entirety for their teachings of melanin, the properties of melanin, their utility in radiation absorbing layers, ancillary materials, processes of manufacture, structures and the like containing melanin.

It is generally known and accepted in the polarizing art that structures use only a dichroic dye or combinations of dichroic dyes to get the desired color and absorption of light in the PVA polarizers. This is specifically disclosed and considered in U.S. Pat. No. 4,859,039. It is noted therein that, (column 3 line 35) "Mixing various dyes is necessary, which respectively have different absorption and polarization characteristics at different wavelength regions within the range of 400–700 nm. One dye only is hardly able to provide a polarizing film, over the entire visible light region of 400–700 nm, showing the same absorption characteristics, i.e., neutral gray, and having a high polarizing coefficient." Then it is noted that, (column 2 line 27) "Any organic direct dyes may be employed in the present invention, as long as the dichroism ratio is large."

SUMMARY OF THE INVENTION

A dichroic dye can be blended with a non-dichroic dye (Melanin, synthetic melanin and melanin derivatives) and still maintain a commercially acceptable level of polarizing efficiency of >97% (as later defined in this text). Efficient polarizers exhibit polarizing efficiencies of >95% and the best are >98%. Since Melanin has unique features with respect to absorption of wavelengths of light, melanin is very useful to have in combination with a polarizer that takes advantage of this absorption. The blending can be done by a mixture (preferably an aqueous mixture) of Melanin and a dichroic dye in a ratio sufficient to achieve the desired color and polarizing effect. Alternatively, the PVA film may be first passed through the solution of the dichroic dye and then the solution of Melanin dye or the Melanin dye and then the dichroic dye. It was found that an efficient polarizer layer can be made where the dichroic dye contributes from 10–90% of light absorption (preferably from 30–70% or 35–65%, or 40–60%, e.g., one half) and the melanin dye contributed the remaining amount of the desired absorption of light in the region of 400–700 nm. To make the polarizing sheet, for example, the oriented PVA film is passed through the aqueous mixtures as described in the examples in 4,859,039. The films may be used in providing polarizing properties to any reflective or transmissive element such as reflecting mirrors, goggles, eye shields, swimming or diving goggles, sunglasses, ophthalmic lenses and the like.

DETAILED DESCRIPTION OF THE INVENTION

Figure 1:
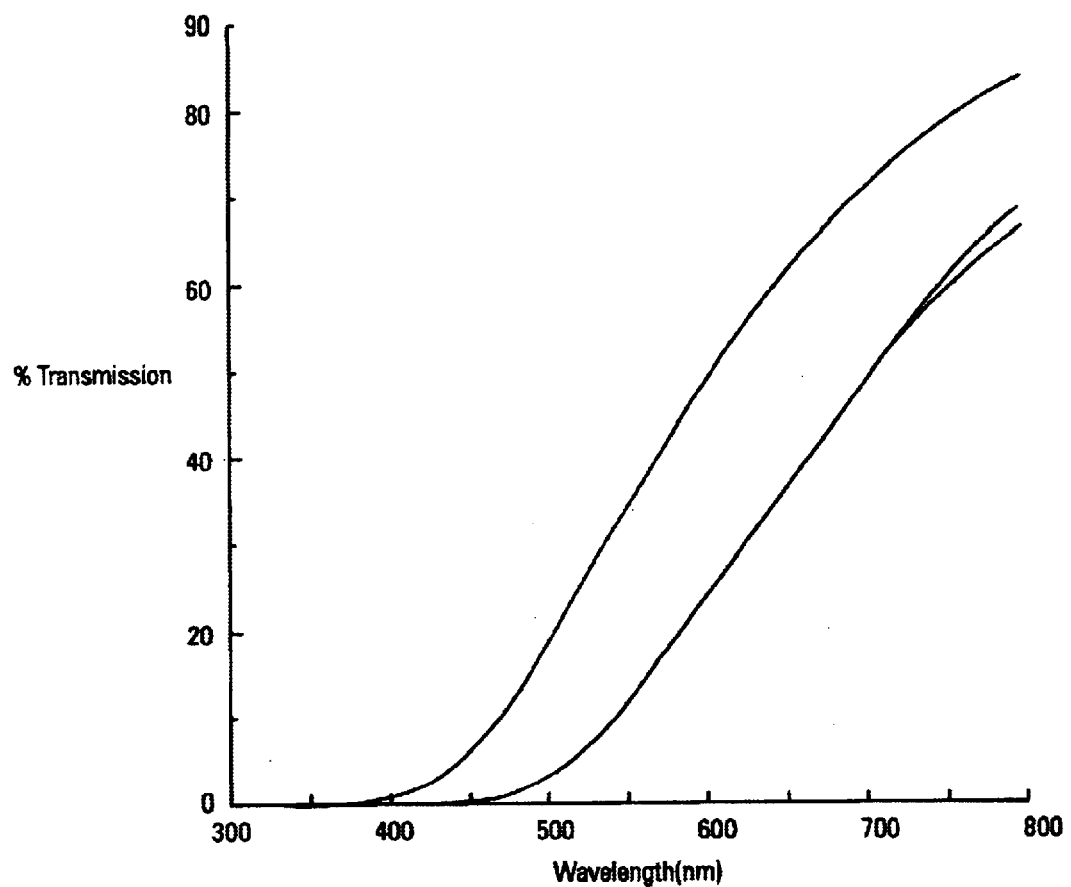
FIG. 1 shows the transmission spectra for a film containing melanin similar to that prepared according to Example 1, but without any dichoric dyes. There are three curves. The highest transmitting one is of the film at 45° to the spectrometer axis in a single layer. The middle curve is the transmission of two layers of films that are mounted with their polarizing axes parallel. The third curve is the transmission of the films with their polarizing axes perpendicular. Very little polarization efficiency is seen (curve 2 and 3 are nearly the same) because the film lacks dichoric dyes.

For the purposes of the present description, melanins are defined below and are further described and classified as in the book entitled "Melanins," by R. A. Nicolaus, published in 1968 by Hermann, 115, Boulevard Saint-Germain, Paris, France, which work in its entirety is incorporated herein by reference. As defined by Nicolaus, melanins constitute a class of pigments which are widespread in the animal and vegetable kingdoms. While the name "melanin" in Greek means black, not all melanins as pigments are black but may vary from brown to yellow.

Mammalian colors are determined chiefly by two types, eumelanins and phaeomelanins. Eumelanins are derived from the precursor tyrosine and are generally insoluble and black or brown in color. Phaeomelanins have as their precursors tyrosine and cysteine and are generally alkali-soluble and lighter in color. Allomelanins ("allo" meaning other) are formed from nitrogen-free precursors, primarily catechol and 1,8-dihydroxynaphthalene (see The Merck Index, Tenth Edition, page 827, item 5269, Melanins). Quinones are the usual intermediates in allomelanin synthesis. The synthesis of melanins occurs in nature as well as being produced synthetically. A further group of low molecular weight yellow, red and violet pigments is known as trichochromes. The trichochromes are usually classified with the melanins, since they serve as pigments and are derived from the oxidation of tyrosine.

Melanins are polymers produced by polymerization of reactive intermediates. The polymerization mechanisms include but are not limited to autoxidation, enzyme catalyzed polymerization and free radical initiated polymerization. The reactive intermediates are produced chemically or enzymatically from precursors. Suitable enzymes include, but are not limited to peroxidases and catalases, polyphenol oxidases, tyrosinases, tyrosine hydroxylases or lactases. The precursors which are connected to the reactive intermediates are hydroxylated aromatic compounds. Suitable hydroxylated aromatic compounds include, but are not limited to 1) phenols, polyphenols, aminophenols and thiophenols of aromatic or polycyclic aromatic hydrocarbons, including but not limited to phenol, tyrosine, pyrogallol, 3-aminotyrosine, thiophenol and alpha-naphthol; 2) phenols, polyphenols, aminophenols, and thiophenols of aromatic heterocyclic or heteropolycyclic hydrocarbons such as but not limited to 2-hydroxypyrrole, 4-hydroxy-1,2-pyrazole, 4-hydroxypyridine, 8-hydroxyquinoline, and 4,5-dihydroxybenzothiazole. The term melanin includes naturally occurring melanins which are usually high molecular weight polymers (generally, molecular weights in the millions) and low molecules weight polymers as well as melanin analogs as defined below. Naturally occurring melanins include eumelanins, phaeomelanins, neuromelanins and allomelanins. The term melanin is also intended to include trichochromes when used hereafter. The term "melanin" is further intended to include both melanin, melanin precursors, melanin analogs, melanin variants and melanin derivatives unless the context dictates otherwise.

Melanin Analog: Melanin in which a structural feature that occurs in naturally occuring or enzymatically produced melanins is replaced by an unusual substituent divergent from substituents traditionally present in melanin. An example of an unusual substituent is selinium in place of sulfur, such as selinocysteine.

Figure 4:
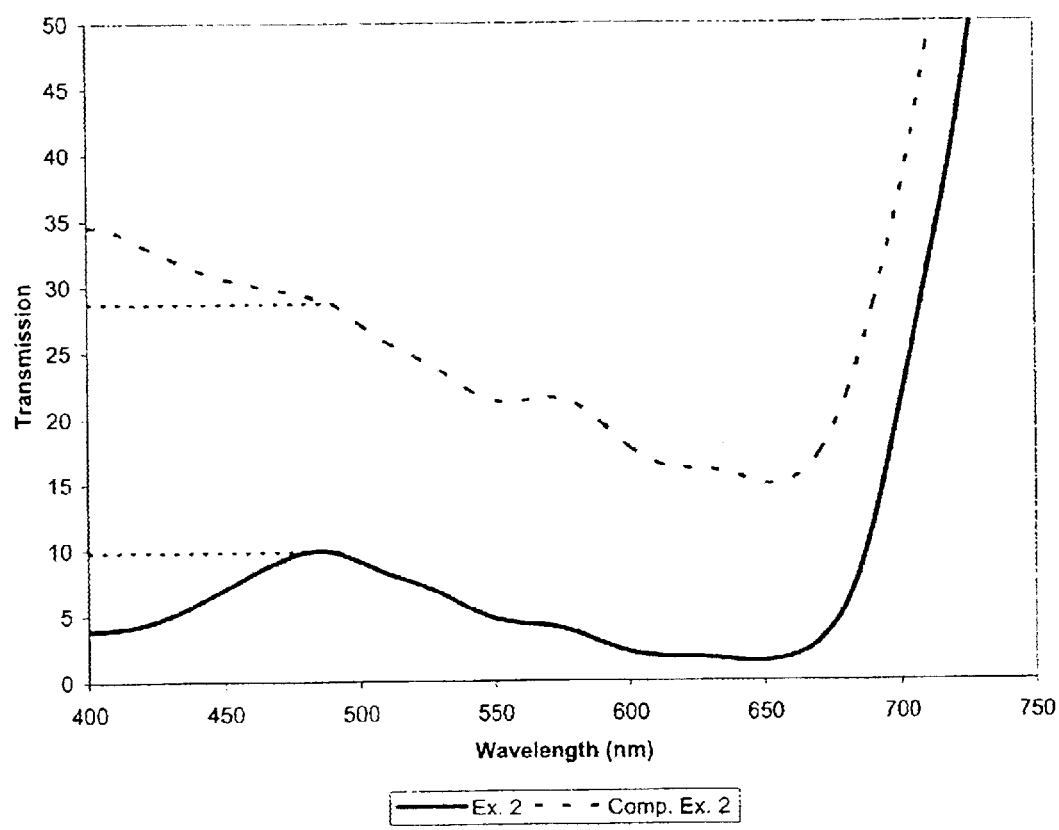
FIG. 4 shows the transmission spectra for Example 2 and Comparison Example 2.

As set forth in more detail in Nicolaus' book, Melanins, the synthetic or natural melanins are the free-radical polymerization products of the melanin precursors. An illustration of the synthetic or natural melanins is the oxidation of tyrosine to DOPA, followed by the free-radical polymerization of DOPA to melanin. The allomelanins may be formed by the free-radical polymerization of a nitrogen-free melanin precursor such as catechol. Whatever the melanin precursor, the polymerization results in the formation of a polymer, melanin, whose exact number of units of melanin precursor are not known. Because of the number of reactive sites in the melanin precursor and its intermediates, this polymerization is heterogeneous and the result is an amorphous, highly irregular, three dimensional polymer whose structure is poorly characterized. Therefore, a given melanin is characterized primarily by its precursor and the spectroscopic properties of the melanin rather than by an exact determination of the structure and chemical formula of the melanin. Hence, a melanin is characterized as follows:

1. a polymer of a monomeric melanin precursor
2. a polymer whose monomeric precursors polymerize via a free-radical mechanism
3. a polymer with a broad band optical absorption spectrum as shown in FIG. 1
4. a polymer with a stable free-radical which is often studied through ESR spectroscopy
5. an amorphous, three dimensional, heterogeneous polymer of varying molecular weight.

Melanins may also be synthesized so that they are more soluble in aqueous solutions, as in the following synthetic procedure. A soluble melanin was prepared by reacting 5 mM of DL-DOPA and either 180 ug of tyrosinates (Neurospora crassa) or 10 μg of tyrosinase (Mushroom)

(Equivalent to 20 U of tyrosinase) in a 0.125 M sodium acetate buffer pH 5.0, in a final volume of 1 ml. The acidic protein Bovine serum albumin (BSA) with pH 4.6 and a molecular weight 66,000 kD, at different concentrations (Table 1) was tested. The control sample was without the acidic protein. The samples were incubated for 12 hours at 25° C., and then centrifuged at 16,000 rpm for 10 minutes to pellet the melanin. The absorbance of the supernatant was measured at 500 nm to determine the level of soluble or non-pelletable melanin. The pellet was washed and sonicated in 1 ml distilled water In the present invention, examples of melanin precursors are DOPA and dopamine which form the eumelanins and catechol which forms an allomelanin respectively. Other known melanin precursors which may be used in the present invention are 5,6-dihydroxyindole; leucodopachrome; tryptamine; serotonin; 5,6-dihydroxyindole-2-carboxylic acid; epinephrine; norepinephrine; tyrosine, adrenochrome; and 1,8-di-hydroxynapthalene.

Heretofore, in preparing synthetic melanins oxygen has been used to initiate the free-radical polymerization in a base and water solution. H is possible to initiate this reaction using a free-radical initiator and to use other solvents. A preferred free-radical initiator is benzoyl peroxide. Other free-radical initiators are di-tert-butyl peroxide and di(1-cyano-1-methyl ethyl)diazene(azobisisobutyronitrile). The choice of the free-radical initiator is determined by its solubility properties and the desired reaction kinetics. Other initiator systems besides peroxides and azo compounds include redox pairs, photochemical systems, perborates, percarbonates and radiation. The typical solvent for preparing the synthetic melanins is water, however, applicant has found that organic solvents such as dimethyl sulfoxide (DMSO), chloroform, toluene and 1,2-dichloroethane may also be used.

These melanins of the present invention are all the polymerization reaction products of the melanin precursors used, which as polymerization reaction products are amorphous, highly irregular polymers. These polymers may have a number of varying structures according to the present invention; however, the polymer or mixture thereof is characterized as having the broadband optical absorption spectrum as shown in FIG. 1. This characteristic of the melanins as utilized in the present invention is very important in that the absorption characteristics are very similar to the action spectrum for retinal damage. In fact, an essential feature of the present invention is that the absorption spectrum associated with melanin is very similar to the action spectrum for retinal damage. It is known that although the cornea and lens absorb most of the ultraviolet rays from the sun, there is still a range of wavelengths between 400 nm and 550 nm which reach the retina and cause photochemical damage. This damage increases exponentially as the wavelength is decreased toward 400 nm and it has been shown that this action spectrum is very similar to the absorption spectrum of melanin. Relatively few of the sunglass manufacturers have managed to produce lenses which filter out ultraviolet radiation and, of those, most cut out the ultraviolet wavelengths abruptly, while allowing the region between 400 nm and 550 nm to be transparent. Therefore an optical lens comprising melanin which is placed in front of the eye would not only filter out radiation damaging to the retina, but it would also filter out the wavelengths in the proper proportions. Of course such a lens would also offer radiation protection to the cornea and lens of the eye.

Various functional layers or coatings may be added to the optical films and devices of the present invention to alter or improve their physical or chemical properties, particularly along the surface of the film or device. Such layers or coatings may include, for example, slip agents, low adhesion backside materials, conductive layers, antistatic coatings or films, barrier layers, flame retardants, UV stabilizers, abrasion resistant materials, optical coatings, compensation films, retardation films, diffuse adhesives, and/or substrates designed to improve the mechanical integrity or strength of the film or device. In addition, an adhesive may be applied to the polyvinyl alcohol film to adhere the film to the substrate. This may be particularly useful when the polyvinyl alcohol film is removed from a first substrate and then placed on a second substrate. A variety of adhesives may be used including, for example, resins and pressure sensitive adhesives (PSA). When choosing a suitable adhesive, the optical properties of the adhesive are usually considered. The addition of a second polymer to the polyvinyl alcohol film provides an improved dichroic polarizer which is compatible with the simultaneous orientation of the polyvinyl alcohol film and a multilayer optical film, such as a reflective polarizer or mirror film. The advantage of using the improved dichroic polarizer is that the dichroic and multilayer optical film may be oriented together, thereby forming, for example, an optical polarizer which may have dichroic and reflective elements that are more perfectly aligned. Furthermore, the addition of a second polymer to the polyvinyl alcohol film often improves the adhesion of the film to a substrate.

A method for forming a polarizing element according to the present invention may comprise, for example, providing a polymeric film that absorbs aqueous solutions; immersing the polymeric film in at least one aqueous solution comprising a dichroic dye and at least one aqueous solution comprising a dissolved melanin; removing the polymeric film after a light absorbing concentration of melanin and dichroic dye have been absorbed by the polymeric film; and drying the polymeric film to form the polarizing element. The dichroic dye and the melanin may be present in the same or in separate aqueous solutions. It is preferred that they be present in separate solutions to make the concentration of each material more readily controlled. Where the dichroic dye and the melanin are present in separate solutions, the polymeric film may be first immersed in the solution comprising the dichroic dye or first in the solution comprising the melanin. The polymeric film may be stretched after removal of the polymeric film from the solution comprising the melanin. It is desirable to harden the polarizing coating after the dye and melanin has been added. This usually should be done after or during the absorption of the last optical material to be absorbed by the film, such as the melanin or the dichroic dye. Hardening agents include materials known to harden, crosslink, cure or further polymerize the film. For example, with polyvinyl alcohol, boric acid is one of a number of well known hardening agents.

The multilayer optical film and the polyvinyl alcohol film are then simultaneously drawn to form an oriented multilayer optical film and an oriented polyvinyl alcohol film. In some embodiments, the multilayer optical film is drawn multiple times. In these embodiments, the polyvinyl alcohol film is often coated or laminated on the multilayer optical film prior to the final draw. In alternative embodiments, the two films may be drawn and oriented separately. Known devices may be used to draw the two films, including, for example, tenters or long orienters. Drawing the polyvinyl alcohol film and the multilayer optical film together typically results in the orientation axis of the polyvinyl alcohol layer being coincident with the axis of final orientation of the multilayer optical film, which may be either a polarizer film or a mirror film. Dichroic dye material may be added prior to drawing the films, or may be incorporated later by, for example, staining the polyvinyl alcohol film, as described above.

EXAMPLE

The present invention will now be described in more detail in reference to Examples and Comparative Examples, which are for illustration purpose only and should not be construed as limiting the scope of the invention in any way. For anyone who is familiar with the art, it is easy to change at least the conditions, thicknesses, variables and additives in the examples to affect different film properties. The examples provide specific materials that are exemplary of the generic concepts described in the specification The polarizing efficiency (PE) of the films is determined by transmission measurements. The transmission and other optical properties are measured using Hunter Lab UltraScan™ spectrophotometer equipped with a polarizer in the optical path. A transmission spectrum between 400 and 750 nm is recorded with the optical axis of a film sample being parallel to the optical axis of the polarizer and then another spectrum is recorded after rotating the polarizer 90° Thus the transmission in both situations, denoted by $T_=(\lambda)$ and $T_{195}$ ($\mu$) respectively for a given wavelength $\lambda$ are determined. The polarizing efficiency, PE($\lambda$), is calculated then by the formula:

$$PE(\lambda) = \sqrt{\frac{T_=(\lambda) - T_\perp(\lambda)}{T_=(\lambda) + T_\perp(\lambda)}} * 10$$

Total visible light transmission (TLT) and Color parameters (L, a*, b*) are direct readout from the instrument.

Comparison Example 1

A poly(vinyl alcohol) film (Kuraray Vinylon™ #7500 film forming polymer) is dyed in an aqueous solution bath containing 0.5 g of Direct Blue 12, at 40° C. for 1 minutes. The film is slowly stretched to 5 times of its original length during the immersion. It is then rinsed with water, air dried, and heat treated at 110° C. for 10 minutes while still under tension.

Example 1

A poly(vinyl alcohol) film (Kuraray Vinylon™ #7500 film forming polymer) is stretched 3 times while being immersed in a 5 wt. % melanin (aqueous melanin from Photoprotective Technologies) aqueous solution bath at 48° C. for 2.5 minutes. The film is then immersed into 1 liter of dye solution containing 0.5 g of Direct Blue 12 at 41° C. for 50 seconds. The film is slowly stretched to 5 times of its original length during the immersion. The film is then rinsed with water, air dried, and heat treated at 110° C. for 10 minutes while still under tension, to produce a melanin-containing, blue polarizing film.

Comparison Example 2

A poly(vinyl alcohol) film (Kuraray Vinylon™ #7500 film forming polymer) is immersed in 1 litter of aqueous solution containing 0.3 g of Congo Red, 1.9 g of Chicago Sky Blue, and 0.5 g of Direct Yellow (all dyes are available from Aldrich Chemicals, Milwaukee, Wis.) for 13 minutes at 38.8° C. The film is then transferred into 1-liter acid solution containing 12.0 g of boric acid and 0.6 g of chromium nitrate. It is stretched mono-axially to 6 times of its original length while being kept in the acid solution. The stretched film is rinsed with water, air dried, and heat treated at 110° C. for 10 minutes while still under tension.

Example 2

A poly(vinyl alcohol) film (Kuraray Vinylon™ #7500 film forming polymer) is stretched 2 times while being immersed in a 5 wt. % melanin aqueous solution bath at 49° C. for 4 minutes. It is then immersed in 1 litter of aqueous solution containing 2.5 wt. % of melanin, 0.3 g of Congo Red, 1.9 g of Chicago Sky Blue, and 0.5 g of Direct Yellow (all dyes are available from Aldrich Chemical Company, Milwaukee, Wis.) for 13 minutes at 40° C. The film is transferred into 1-liter acid solution containing 12.0 g of boric acid and 0.6 g of chromium nitrate. It is stretched mono-axially to 6 times of its original length while being kept in the acid solution. The stretched film is rinsed with water, air dried, and heat treated at 110° C. for 10 minutes while still under tension, to produce a melanin-containing blue-gray polarizing film.

The optical properties of the films are listed in Table 1. In the single blue dye case (Example 1 and Comparison example 1), the films show polarizing efficiencies higher than 90% at the minimum transmission. In the case that three dyes are used (Example 2 and Comparison example 2), polarizing efficiency of higher than 99% is obtained even when calculating with the overall light transmission values. The use of melanin does not seem to degrade the polarizing effect of the dichroic dyes.

Figure 3:
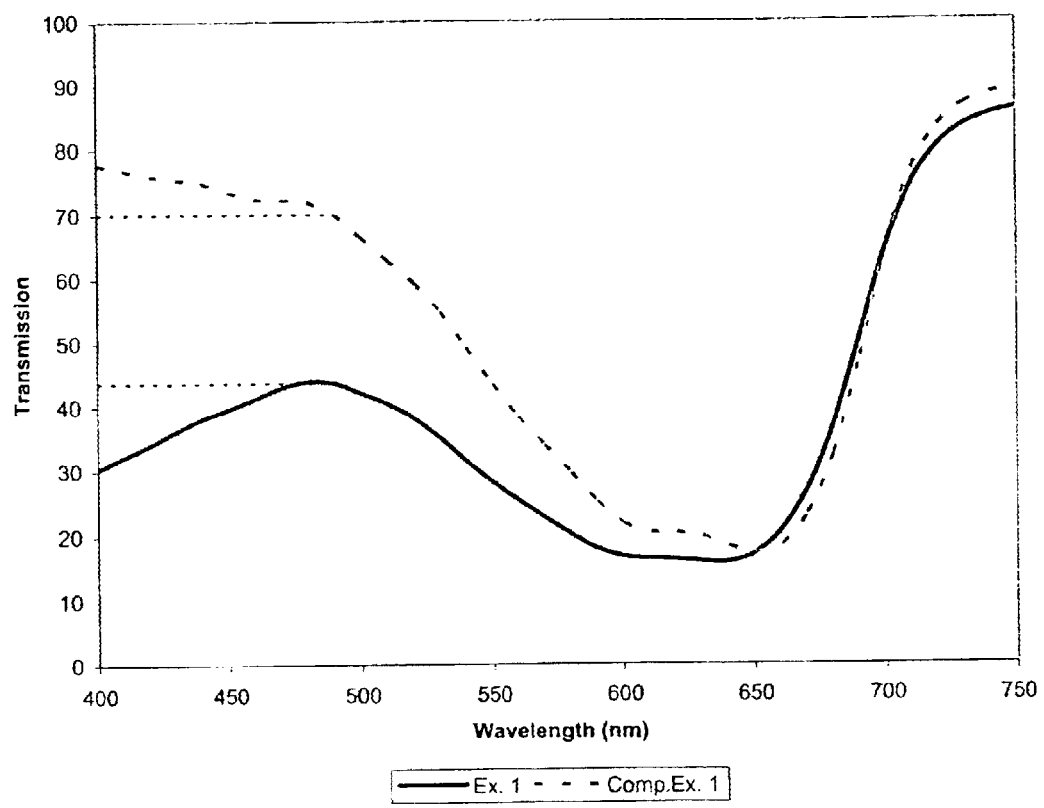
FIG. 3 shows the transmission spectra for Example 1 and Comparison Example 1.

The spectrum comparisons of films with and without melanin are shown in FIGS. 3 and 4. From the figures, it is obvious that addition of melanin reduces the transmission of high-energy visible light from 490 nm down to 400 nm. Light in this wavelength region can cause eye fatigue.

It is thus demonstrated that the hydrophilic melanin can be readily incorporated, together with dichroic dye(s) of choice, into a PVA film to form a melanin-containing polarizing film. The addition of melanin does not degrade the polarizing efficiency.

TABLE 1

| Samples | Melanin | TLT (%) | Color L | a* | b* | Polarizing Efficiency (%) Maximum | overall |
|---|---|---|---|---|---|---|---|
| Comp. Ex. 1 | no | 42.0 | 70.8 | −16.4 | −30.3 | 90.0 at 650 nm | — |
| Ex. 1 | yes | 27.7 | 59.6 | −15.4 | −16.7 | 96.2 at 640 nm | — |
| Comp. Ex. 2 | no | 21.8 | 53.7 | −2.9 | −14.2 | 99.9 at 540 nm | 99.7 |
| Ex. 2 | yes | 5.0 | 26.8 | −15.3 | −9.9 | 99.6 at 540 nm | 99.1 |

Overall means over the entire visible range (approximately 400 to 700 nm)

Example 3

A polyvinyl alcohol (Kuraray Vinyon® #7500 film forming polymer) film (75 microns thick) was dyed at 40° C. for 15 minutes in an aqueous solution containing 0.40 g/liter of Chlorantine Fast Red, 0.30 g/liter of Brilliant Blue 6B and 0.30 g/liter of Chrysophenine (three dichroic dyes). The film was subsequently dyed at 40° C. for 15 minutes in an aqueous solution with a pH of 7 containing 1% by weight of Melanin.

The dyed film was immersed for 10 minutes at room temperature in an aqueous solution containing 0.3 g/liter of nickel acetate tetrahydrate and 12.2 g/liter of boric acid at room temperature for 10 minutes, and monoaxially stretched in the same solution to 4 times its original size. It was then taken out of the solution, and while it was maintained under tension, it was washed with water and dried, then heat-treated at 110° C. for 10 minutes to obtain a polarizing film.

The resultant film had a polarizing efficiency of 97% across the visible spectrum.

Figure 2:
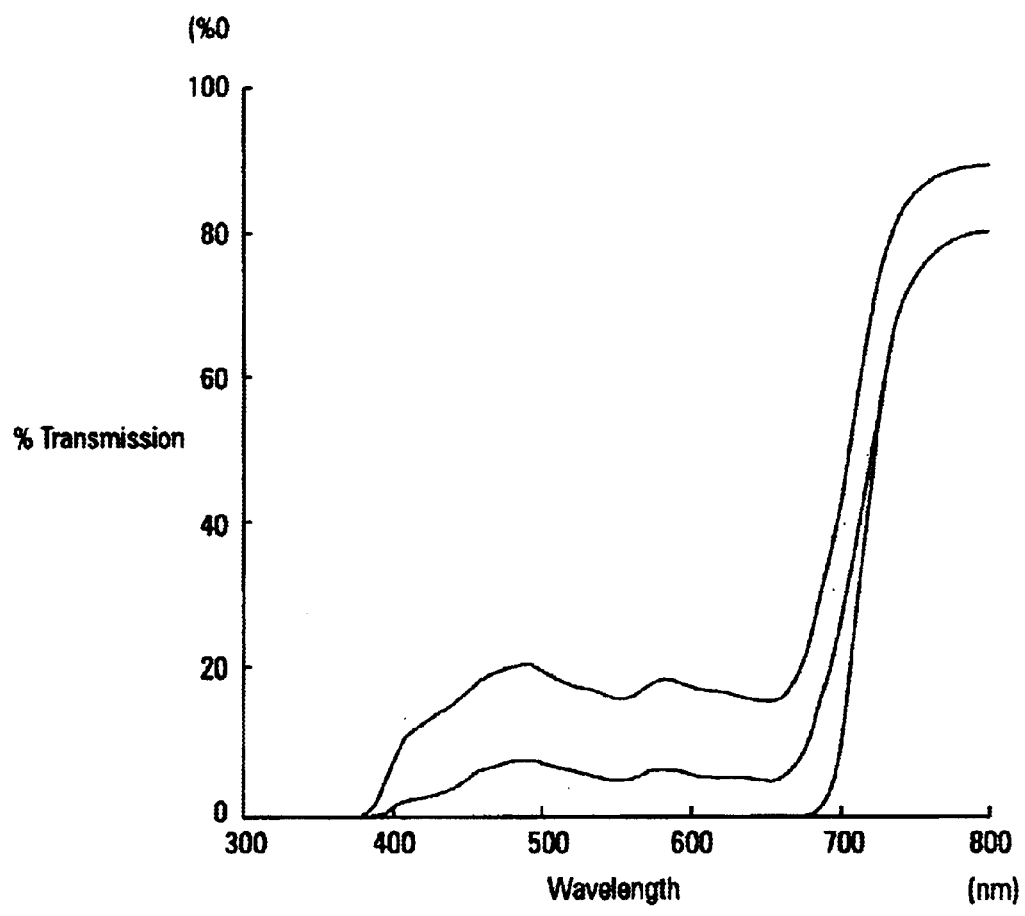
FIG. 2 shows the transmission spectra for a standard polarizing element having dichoric dyes but no melanin. There are three curves. The highest transmitting one is of the polarizing element at 45° to the spectrometer axis in a single layer. The middle curve is the transmission of two polarizing elements that are mounted with their polarizing axes parallel. The third curve is the transmission of the two polarizing elements with their polarizing axes perpendicular. Since curve 2 and 3 are very different, there is high polarization efficiency.

For comparison, a normal, gray color polarizing film made with the above dichroic dyes but without the melanin has a spectra as shown in FIG. 2.

What is claimed:

1. A method for forming a polarizing element comprising:
   providing a polymeric film that absorbs aqueous solutions;
   immersing the polymeric film in at least one aqueous solution comprising a dichroic dye and at least one aqueous solution comprising a dissolved melanin;
   removing the polymeric film after a light absorbing concentration of melanin and dichroic dye have been absorbed by the polymeric film; and
   drying the polymeric film to form the polarizing element.
2. The method of claim 1 wherein the dichroic dye and the melanin are present in separate aqueous solutions.
3. The method of claim 2 wherein the polymeric film is first immersed in the solution comprising the dichroic dye.
4. The method of claim 2 wherein the polymeric film is first immersed in the solution comprising the melanin.
5. The method of claim 1 wherein the polymeric film is stretched after removal of the polymeric film from the solution comprising the melanin.
6. The method of claim 2 wherein the polymeric film is stretched after removal of the polymeric film from the solution comprising the melanin.
7. The method of claim 3 wherein the polymeric film is stretched after removal of the polymeric film from the solution comprising the melanin.
8. The method of claim 7 wherein a hardening agent is applied to the polymeric film after immersion and removal from the solution comprising melanin.
9. The method of claim 1 wherein the dichroic dye and the melanin are present in the same aqueous solutions.
10. The method of claim 1 wherein after drying, the polarizing element is adhered to a polymeric ophthalmic lens.
11. The method of claim 2 wherein, after drying, the polarizing element is adhered to a polymeric ophthalmic lens.
12. The method of ciaim 3 wherein, after drying, the polarizing element is adhered to a polymeric ophthalmic lens.
13. The method of claim 4 wherein, after drying, the polarizing element is adhered to a polymeric ophthalmic lens.
14. The method of claim 5 wherein, after drying, the polarizing element is adhered to a polymeric ophthalmic lens.
15. The method of claim 6 wherein, after drying, the polarizing element is adhered to a polymeric ophthalmic lens.
16. The method of claim 7 wherein, after drying, the polarizing element is adhered to a polymeric ophthalmic lens.
17. The method of ciaim 8 wherein, after drying, the polarizing element is adhered to a polymeric ophthalmic lens.
18. The method of claim 9 wherein, after drying, the polarizing element is adhered to a polymeric ophthalmic lens.
19. The method of claim 10, wherein the polymeric ophthalmic lens comprises a polycarbonate ophthalmic lens.

* * * * *